May 14, 1935.    W. R. FREEMAN    2,001,415
LEVER LOCK
Filed Feb. 6, 1932
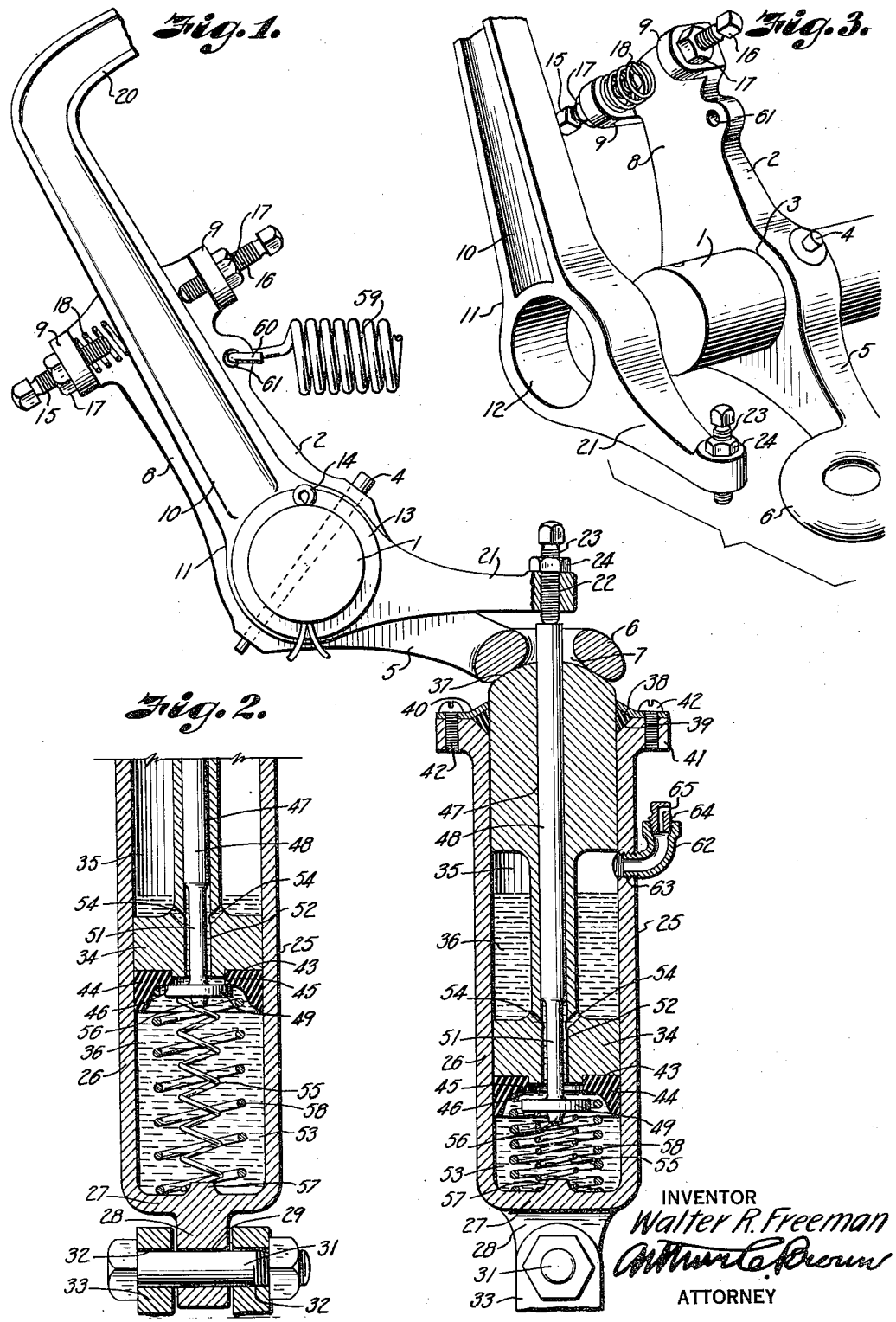
INVENTOR
Walter R. Freeman
ATTORNEY Patented May 14, 1935

2,001,415

UNITED STATES PATENT OFFICE 2,001,415

LEVER LOCK

Walter R. Freeman, Jay, Okla., assignor of one-fourth to John D. Freeman, Tulsa, Okla., and one-fourth to Claude D. Freeman, Dallas, Tex.

Application February 6, 1932, Serial No. 591,425

5 Claims. (Cl. 74—527)

My invention relates to check-controlled apparatus, and more particularly to a lever lock, the present invention being especially adaptable for use in connection with brake and clutch levers of a vehicle.

In operating a present day vehicle, such as an automobile, bus, truck or tractor, a considerable amount of manual effort is required for maintaining the brake in applied condition, for retaining the clutch in disengaged position, and also for continuously holding the accelerator in a substantially uniform position on long stretches of level roads.

It is the principal object of my invention to provide means for materially reducing this manual effort and to accomplish this result in a manner which cannot interfere with brake-application or clutch-disengaging operations.

A further object of the invention is to embody means in a device of this character for so adjusting the actuation of the lock or control mechanism that its operation is substantially automatic.

Another object is to provide a simple and inexpensive mechanism for this purpose which is not only effective in operation, but which can be supplied to the regular equipment of a vehicle at a slight additional cost.

In accomplishing these and other objects of my invention, I have provided improved details of structure, the preferred form of which is illustrated in the accompanying drawing, wherein:

Fig. 1 is a vertical sectional view of the control cylinder in operable relation with a clutch lever shown in elevation and in normally engaged position.

Fig. 2 is a vertical section of the lower end of the control cylinder with the piston and control valve in the position assumed when the clutch is in disengaged position.

Fig. 3 is a perspective view of cooperating primary and secondary levers, shown in disassembled relation.

Referring more in detail to the drawing:

I designates a shaft which, in the present disclosure, indicates a clutch shaft whereon is mounted a main or primary lever 2 having an opening 3 intermediate its ends for receiving the shaft, a cross pin 4 being used for securing the lever to the shaft.

The lever further includes a lower arm 5 terminating in an eye member 6 projecting laterally therefrom and having a substantially concave lower surface 7 for a purpose presently described. The opposite end of the lever comprises an arm 8 provided adjacent its end with spaced inwardly directed ears 9 for receiving therebetween the arm 10 of a secondary lever 11 provided also with an opening 12 so that the secondary lever may be freely mounted on the clutch shaft in juxtaposition with the primary lever and retained on the clutch shaft by a washer 13 and cotter pin 14.

In this manner the secondary lever is free to rock on the clutch shaft, but is limited in its freedom of movement by opposite set screws 15 and 16 threaded through the ears 9 and secured in adjusted position in the ears by lock nuts 17, a compression spring 18 being mounted over the lower set screw 15 for engaging the lower edge of the secondary lever to normally urge the lever into stop-engagement with the upper screw 16.

The upper end of the secondary lever arm 10 is retractively bent, as indicated at 20, and carries the usual foot pedal (not shown), and on its opposite end the secondary lever is provided with a relatively short arm 21 provided with a threaded opening 22 for receiving a set screw 23 locked in adjusted position in the arm by a lock nut 24 and aligning substantially concentrically with the eye 6 of the primary lever.

In order to lock the primary lever in depressed condition so that the only manual effort required for maintaining the clutch in disengaged position will be to compress the spring 18, a hydraulic locking unit 25 is employed including a cylinder 26, closed on its lower end by a wall 27, to which may be integrally formed an ear 28 provided with a bearing opening 29. The cylinder may be pivotally mounted on a bearing bolt 31 extended through the ear and through aligning openings 32 of bracket ears 33 comprising a portion of any suitable supporting bracket or other supporting member of the vehicle.

Slidably mounted in the cylinder 26 is a piston 34 formed intermediate its ends with an annular recess 35 to produce a reservoir for liquid 36. The outer end of the piston projects upwardly from the cylinder and is preferably rounded, as indicated at 37, for firmly engaging the lower concave face 7 of the eye member 6.

It is desirable to prevent entrance of grit and foreign matter into the cylinder around the piston and, for this purpose, a compressible packing or wiping element 38 is mounted in a recessed upper edge 39 of the cylinder and is retained therein by a keeper ring 40 secured to an outwardly directed flange 41 of the cylinder by screws 42.

Provided on the lower or head end of the piston 34 is an outer annular recess 43 for seating a sealing ring 44 preferably formed of hard rubber or other suitable material and including an outer flanged portion 45 surrounding a downwardly facing valve seat 46.

The piston is further provided throughout its length with a concentric bore 47 to slidably receive a valve stem 48 carrying a valve disk 49 on its lower end adapted to engage the seat 46, and, adjacent its lower end, the stem is reduced, as shown at 51, to form an annular channel 52 for communicating a chamber 53 in the extreme lower end of the cylinder with the reservoir 35 by means of diverging ports 54 connecting the reservoir with the annular chamber.

Normally, the valve is urged to its seat by a compression spring 55 centered in its relation to the cylinder by a downwardly depending boss 56 on the lower face of the valve and by a boss 57 extending upwardly from the lower end 27 of the cylinder.

A comparatively heavy compression spring 58, surrounding the spring 55, is seated between the lower closed end of the cylinder and the sealing ring of the piston for urging the piston upwardly in the cylinder. However, it is to be noted that the tension of this spring is insufficient to overcome the tension of a coil spring 59 having a hook 60 secured to an eye 61 of the primary lever, and having its opposite end anchored in any conventional manner to the vehicle for returning a depressed clutch lever to normal position.

The reservoir 35 may be filled with liquid through an elbow 62 threaded into an opening 63 of the cylinder and provided with a plug 64 having a vent opening 65.

Assuming an apparatus to be constructed as described, the cylinder may be pivotally mounted to any portion of the vehicle in such a manner that the upper end of the piston engages the arm 5 of the primary lever.

When the clutch is in normal or engaged condition the primary and secondary levers will assume a position as shown in Fig. 1, and the piston will be forced into the cylinder by action of the spring 59. Upon depressing the secondary lever to disengage the clutch, the primary lever will be carried therewith, thus raising the arm 5.

The piston, under tension of the spring 58, is forced into constant engagement with the arm 5, and as the arm is carried through a slight arc in its upward travel the cylinder pivots accordingly on its bearing bolt 31 to maintain the piston in concentric relation with the eye member 6 of the arm. This action, as will be obvious, is facilitated by the rounded end of the piston engaging the concave lower surface of the eye member.

As the piston is forced upwardly by the spring 58, a vacuum is produced in the cylinder below the piston resulting in opening of the valve and in filling of the lower chamber with liquid from the moving reservoir.

When the clutch lever has been depressed to its limit, or to any extent before its limit which might be desired, outward movement of the piston from the cylinder will cease and the valve will be closed by the spring 55, thereby trapping the liquid contained in the cylinder below the piston which, in turn, locks the clutch lever in depressed condition. The only pressure thereafter required for retaining the clutch disengaged is to maintain the secondary lever in stop-engagement with the lower set screw 15 against the tension of the spring 18; a pressure so slight as to be almost negligible. When however, the secondary lever is released, the spring 18 will force the lever into engagement with the stop screw 16, thereby simultaneously depressing the valve stem and moving the valve from its seat to allow return of liquid from below the piston into the reservoir.

As the liquid returns into the reservoir, the piston can again move into the cylinder to permit engagement of the clutch, such movement being effected by the coil spring 59 which is sufficiently strong to overcome the tension of the spring 58.

From the foregoing it will be apparent that I have provided positive locking means for retaining a clutch lever in partially or fully depressed condition until released by opening of the check valve incident to a slight return movement of the secondary lever.

While the invention has been described particularly in connection with a clutch lever, it will be apparent that the same lock or control means may be applied with minor changes to many other types of levers as, for example, a brake lever, an accelerator lever, etc., without departing from the spirit of my invention.

What I claim and desire to secure by Letters Patent is:

1. In combination with primary and secondary levers, locking means including a cylinder, a piston in the cylinder and yielding means for urging the piston into engagement with the primary lever for locking the primary lever in response to a joint movement of the levers in one direction, and valve means operable in response to release of the secondary lever for permitting return movement of the primary lever.

2. In combination with primary and secondary levers, locking means including a cylinder, a piston in the cylinder and yielding means for urging the piston into engagement with the primary lever for locking the primary lever in response to a joint movement of the levers in one direction, and means including a valve, a stem extending through the piston and yielding means urging the stem into engagement with the secondary lever for permitting return movement of the primary lever responsive to release of the secondary lever.

3. In apparatus of the character described, a shaft, a primary lever fixed to the shaft, a secondary lever freely rotatable on the shaft, stop means on the primary lever for limiting freedom of movement of the secondary lever, hydraulic means including a cylinder and a piston in the cylinder engageable with the primary lever for locking the primary lever in response to a joint movement of both levers in one direction, resilient means in the cylinder for yieldingly urging said piston into constant engagement with the primary lever, and valve means adapted to be engaged by the secondary lever for releasing the primary lever in response to return movement of the secondary lever.

4. In apparatus of the character described, a shaft, a primary lever fixed on the shaft having an arm including a lateral eye member, a secondary lever freely rotatable on the shaft having an arm extending substantially transversely over the eye member, stop means on the primary lever for limiting freedom of movement of the secondary lever, hydraulic means including a cylinder and a piston in the cylinder engageable with the eye member of the primary lever for locking of the lever in one direction, and valve means including a stem extending through the eye member and adapted to be engaged by said arm of the secondary lever for releasing the primary lever in response to a return movement of the secondary lever.

5. In combination with a primary lever and yielding means for retaining said lever at one limit of its movement, a secondary lever, yielding means on the primary lever engageable by the secondary lever to effect joint movement of the levers after initial independent movement of the secondary lever and adapted for effecting initial return movement of the secondary lever, a cylinder, a piston in the cylinder including a chamber adapted for connection with one end of the cylinder, yielding means urging the piston against the primary lever, a valve yieldingly urged to close communication between the piston chamber and the end of the cylinder, and a stem in the valve engageable by the secondary lever to open the valve and permit return of the piston and primary lever to initial position.

WALTER R. FREEMAN.